(12) United States Patent
Yih

(10) Patent No.: US 11,670,952 B2
(45) Date of Patent: Jun. 6, 2023

(54) VOLTAGE ESTIMATION FOR AUTOMOTIVE BATTERY CHARGING SYSTEM CONTROL

(71) Applicant: Paul Yih, Auburn Hills, MI (US)

(72) Inventor: Paul Yih, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 627 days.

(21) Appl. No.: 16/657,622

(22) Filed: Oct. 18, 2019

(65) Prior Publication Data

US 2021/0119471 A1    Apr. 22, 2021

(51) Int. Cl.
  *H02J 7/14*      (2006.01)
  *B60L 58/10*     (2019.01)
  *H02J 7/00*      (2006.01)
  *H01M 10/42*     (2006.01)
  *H01M 10/44*     (2006.01)

(52) U.S. Cl.
  CPC ........ *H02J 7/007182* (2020.01); *B60L 58/10* (2019.02); *H02J 7/1446* (2013.01); *H01M 10/4257* (2013.01); *H01M 10/441* (2013.01); *H01M 2010/4271* (2013.01); *H02J 7/00302* (2020.01); *H02J 7/007184* (2020.01)

(58) Field of Classification Search
  CPC ...... H02J 7/04; H02J 7/007184; H02J 7/0026; H02J 7/007182; H02J 7/1446; H01M 10/4257; B60L 58/10
  USPC ...................................................... 320/162
  See application file for complete search history.

(56) References Cited

U.S. PATENT DOCUMENTS

| | | | | |
|---|---|---|---|---|
| 3,594,642 A | * | 7/1971 | Wright | G01R 31/006 324/426 |
| 3,597,654 A | * | 8/1971 | Harland, Jr. | H02J 7/16 361/88 |
| 4,258,307 A | * | 3/1981 | Mori | H02J 7/163 322/73 |
| 4,315,204 A | * | 2/1982 | Sievers | G01R 31/007 322/99 |
| 4,316,134 A | * | 2/1982 | Balan | G01R 31/343 320/136 |
| 4,342,955 A | * | 8/1982 | Gant | H02J 7/1492 322/90 |
| 4,348,629 A | * | 9/1982 | Sievers | G01R 31/343 320/137 |

(Continued)

FOREIGN PATENT DOCUMENTS

JP    H05180055 A  *  7/1993
JP    4285171 B2  *  6/2009

*Primary Examiner* — John T Trischler
(74) *Attorney, Agent, or Firm* — Ralph E. Smith

(57) ABSTRACT

Techniques for controlling charging of a battery of a vehicle comprise receiving, from a positive (B+) voltage sensor, a B+ voltage signal indicative of a voltage at a B+ terminal of an alternator of the vehicle, receiving, from an intelligent battery sensor (IBS), an IBS voltage signal indicative of a voltage at a positive terminal of the battery, applying high pass and low pass filters to the B+ voltage signal and the IBS voltage signals, respectively, estimating a voltage of the battery using both the filtered B+ voltage signal and the filtered IBS voltage signal, adjusting a target voltage for the battery based on the estimated battery voltage, and controlling charging of the battery using the adjusted target voltage to mitigate overcharging and undercharging of the battery.

16 Claims, 3 Drawing Sheets

(56) References Cited

U.S. PATENT DOCUMENTS

| | | | | |
|---|---|---|---|---|
| 4,379,990 A * | 4/1983 | Sievers | H02J 7/0047 | 320/DIG. 13 |
| 4,409,933 A * | 10/1983 | Inoue | F01P 11/16 | 318/471 |
| 4,419,618 A * | 12/1983 | Gretsch | H02P 13/06 | 322/29 |
| 4,451,774 A * | 5/1984 | Akita | H02J 7/24 | 320/123 |
| 4,533,016 A * | 8/1985 | Betton | B60R 25/04 | 307/10.4 |
| 4,638,173 A * | 1/1987 | Milton | H02P 9/30 | 60/39.464 |
| 4,719,361 A * | 1/1988 | Brubaker | B60L 50/12 | 290/14 |
| 4,748,395 A * | 5/1988 | Reynolds | H02J 7/1423 | 322/29 |
| 4,749,935 A * | 6/1988 | Osborne | H02P 9/10 | 219/133 |
| 4,851,833 A * | 7/1989 | Putrow | F02P 17/00 | 345/10 |
| 4,992,672 A * | 2/1991 | Norton | H02J 7/1438 | 322/90 |
| 5,079,496 A * | 1/1992 | Pierret | H02J 7/00308 | 322/99 |
| 5,166,538 A * | 11/1992 | Norton | H02M 3/155 | 322/90 |
| 5,198,698 A * | 3/1993 | Paul | H02J 9/08 | 307/64 |
| 5,332,927 A * | 7/1994 | Paul | H02J 9/08 | 307/64 |
| 5,460,902 A * | 10/1995 | Parker | H01M 10/48 | 324/426 |
| 5,502,368 A * | 3/1996 | Syverson | H02J 7/0047 | 322/29 |
| 5,521,485 A | 5/1996 | Vogelsberger | | |
| 5,631,544 A * | 5/1997 | Syverson | H02K 16/00 | 322/89 |
| 5,642,033 A * | 6/1997 | Bartol | H02P 9/00 | 322/28 |
| 5,656,922 A * | 8/1997 | LaVelle | H02K 1/278 | 310/263 |
| 5,693,995 A * | 12/1997 | Syverson | H02K 19/36 | 310/156.55 |
| 5,710,471 A * | 1/1998 | Syverson | H02K 19/36 | 310/58 |
| 5,747,909 A * | 5/1998 | Syverson | H02H 7/06 | 310/156.56 |
| 5,808,443 A * | 9/1998 | Lundstrom | H01M 10/44 | 320/DIG. 22 |
| 5,929,609 A * | 7/1999 | Joy | H02J 7/1446 | 322/29 |
| 5,929,613 A * | 7/1999 | Tsuchiya | H02J 7/16 | 322/58 |
| 6,009,369 A * | 12/1999 | Boisvert | F02P 19/026 | 219/486 |
| 6,330,463 B1 * | 12/2001 | Hedrich | H02J 9/061 | 455/343.6 |
| 6,351,102 B1 * | 2/2002 | Troy | G01R 31/382 | 320/137 |
| 6,353,306 B1 * | 3/2002 | Mixon | H02J 7/14 | 320/160 |
| 6,400,125 B1 | 6/2002 | Pierret et al. | | |
| 6,404,163 B1 | 6/2002 | Kapsokavathis et al. | | |
| 6,445,158 B1 * | 9/2002 | Bertness | G01R 31/007 | 320/139 |
| 6,466,024 B1 * | 10/2002 | Rogers | H02J 7/007192 | 60/284 |
| 6,466,025 B1 * | 10/2002 | Klang | G01R 31/34 | 324/426 |
| 6,515,456 B1 * | 2/2003 | Mixon | H02J 7/007194 | 320/160 |
| 6,817,320 B2 * | 11/2004 | Balan | F02B 43/08 | 123/3 |
| 6,822,425 B2 * | 11/2004 | Krieger | H02J 7/007 | 320/137 |
| 6,924,621 B2 * | 8/2005 | Jabaji | H02J 7/1492 | 320/117 |
| 7,009,366 B2 * | 3/2006 | Maehara | H02J 7/0047 | 320/123 |
| 7,039,534 B1 * | 5/2006 | Ryno | G01R 19/16542 | 320/135 |
| 7,420,295 B2 * | 9/2008 | Omae | H02J 9/061 | 320/101 |
| 7,602,144 B2 * | 10/2009 | Seo | H02J 7/0048 | 324/434 |
| 7,612,524 B2 * | 11/2009 | Howell | H02J 7/1438 | 320/134 |
| 7,705,556 B2 * | 4/2010 | Abe | H02J 7/0029 | 322/88 |
| 7,705,602 B2 * | 4/2010 | Bertness | G01R 31/3648 | 324/426 |
| 7,821,227 B2 * | 10/2010 | Howell | H02J 7/00306 | 320/134 |
| 7,821,234 B2 * | 10/2010 | Moriya | G01R 31/3842 | 324/426 |
| 8,116,998 B2 * | 2/2012 | Hess | G01R 31/392 | 702/65 |
| 8,203,311 B2 * | 6/2012 | Takahashi | B60L 53/11 | 320/132 |
| 8,426,063 B2 * | 4/2013 | Lin | B60L 58/26 | 429/211 |
| 8,493,022 B2 * | 7/2013 | Bertness | G01R 31/3648 | 320/104 |
| 8,504,240 B2 * | 8/2013 | Otake | H02P 9/04 | 701/40 |
| 8,614,563 B2 * | 12/2013 | Baughman | H02J 7/0016 | 320/118 |
| 8,749,193 B1 * | 6/2014 | Sullivan | H02J 7/1461 | 320/104 |
| 9,130,377 B2 * | 9/2015 | Barsukov | H02J 7/0048 | |
| 9,168,881 B2 * | 10/2015 | Garofalo | B60R 16/033 | |
| 9,450,485 B2 * | 9/2016 | Imoto | B60R 16/03 | |
| 9,735,718 B2 * | 8/2017 | Grafling | H02P 9/006 | |
| 9,748,881 B2 * | 8/2017 | Wu | H02P 9/302 | |
| 9,841,467 B2 * | 12/2017 | DeMarco | G01R 31/343 | |
| 9,902,277 B2 * | 2/2018 | Keller | H02J 7/0014 | |
| 9,979,211 B2 * | 5/2018 | Barsukov | H02J 7/0016 | |
| 10,020,661 B2 * | 7/2018 | Fujii | H01M 10/425 | |
| 10,093,191 B2 * | 10/2018 | Keller | B60L 53/14 | |
| 10,135,264 B2 * | 11/2018 | Horitake | H02J 7/00036 | |
| 10,335,596 B2 * | 7/2019 | Yakovlev | A61N 1/0553 | |
| 10,461,545 B2 * | 10/2019 | Inoue | H02J 7/0068 | |
| 10,491,205 B2 * | 11/2019 | Remple | G06F 1/32 | |
| 10,601,230 B2 * | 3/2020 | Horitake | B60L 58/21 | |
| 11,011,920 B2 * | 5/2021 | Nakamoto | B60R 16/033 | |
| 11,061,075 B2 * | 7/2021 | Yasunori | H02J 7/0048 | |
| 11,133,680 B2 * | 9/2021 | Wang | H02J 7/0048 | |
| 11,336,104 B2 * | 5/2022 | Poland | G01R 31/392 | |
| 11,495,976 B2 * | 11/2022 | Eo | H02J 7/005 | |
| 2002/0043962 A1 * | 4/2002 | Taniguchi | H02H 7/067 | 322/28 |
| 2003/0016001 A1 | 1/2003 | Borup | | |
| 2003/0052649 A1 * | 3/2003 | Landgraf | H02J 7/1438 | 320/135 |
| 2003/0210014 A1 * | 11/2003 | Jabaji | H02J 7/0031 | 320/104 |
| 2004/0183514 A1 * | 9/2004 | Maehara | H02J 7/243 | 323/286 |
| 2005/0045058 A1 * | 3/2005 | Donnelly | B60L 58/19 | 105/26.05 |
| 2005/0253458 A1 * | 11/2005 | Omae | H02J 7/34 | 307/10.1 |
| 2006/0022639 A1 * | 2/2006 | Moore | H02J 7/0016 | 320/116 |
| 2006/0033475 A1 * | 2/2006 | Moore | H02J 7/0014 | 320/132 |
| 2006/0097698 A1 * | 5/2006 | Plett | H02J 7/0048 | 320/118 |

(56) References Cited

U.S. PATENT DOCUMENTS

| | | | |
|---|---|---|---|
| 2006/0119365 A1* | 6/2006 | Makhija | G01R 31/007 324/380 |
| 2006/0244423 A1* | 11/2006 | Henningson | G01R 31/386 320/150 |
| 2007/0069734 A1* | 3/2007 | Bertness | G01R 31/3648 324/411 |
| 2007/0069735 A1* | 3/2007 | Graf | G01R 31/382 324/416 |
| 2007/0090802 A1* | 4/2007 | Seo | B60L 58/16 320/128 |
| 2007/0210763 A1* | 9/2007 | Aoyama | H02P 9/48 322/28 |
| 2007/0241723 A1* | 10/2007 | Billat | H02J 7/1446 322/28 |
| 2007/0273205 A1* | 11/2007 | Aoyama | H02P 9/02 307/3 |
| 2008/0079389 A1* | 4/2008 | Howell | H02J 7/00306 701/99 |
| 2008/0094034 A1* | 4/2008 | Takahashi | H01M 10/48 320/134 |
| 2009/0128157 A1* | 5/2009 | Moriya | G01R 31/3842 324/426 |
| 2009/0189570 A1* | 7/2009 | Abe | H01M 10/488 320/162 |
| 2009/0208837 A1* | 8/2009 | Lin | H01M 6/425 429/158 |
| 2010/0013302 A1* | 1/2010 | Howell | H02J 7/1438 307/10.7 |
| 2010/0198536 A1* | 8/2010 | Hess | G01R 31/3842 702/63 |
| 2010/0207580 A1* | 8/2010 | Nishida | H02J 7/0069 320/132 |
| 2010/0262404 A1* | 10/2010 | Bertness | G01R 31/007 702/183 |
| 2011/0082621 A1* | 4/2011 | Berkobin | B60L 58/16 701/31.4 |
| 2011/0127960 A1* | 6/2011 | Plett | H02J 7/0014 320/116 |
| 2012/0274331 A1* | 11/2012 | Liu | G01R 31/3835 324/426 |
| 2013/0169234 A1* | 7/2013 | Chuah | H01M 10/448 320/136 |
| 2013/0293194 A1* | 11/2013 | Pallares | H02J 7/14 320/109 |
| 2013/0313897 A1* | 11/2013 | Garofalo | B60L 58/12 307/10.1 |
| 2014/0077752 A1* | 3/2014 | Barsukov | H02J 7/0016 320/103 |
| 2014/0145684 A1* | 5/2014 | Liu | B60L 58/15 320/152 |
| 2014/0191571 A1* | 7/2014 | Imoto | H02M 3/02 307/10.1 |
| 2014/0327407 A1* | 11/2014 | Lucea | H02J 7/0014 320/134 |
| 2014/0361610 A1* | 12/2014 | Wu | H02P 9/302 307/10.1 |
| 2015/0123624 A1* | 5/2015 | Ookawa | B60W 10/08 322/22 |
| 2015/0162759 A1* | 6/2015 | Fujii | H01M 10/482 320/118 |
| 2016/0072316 A1* | 3/2016 | Barsukov | H02J 7/0048 320/112 |
| 2016/0089994 A1* | 3/2016 | Keller | H02J 7/04 320/153 |
| 2016/0103189 A1* | 4/2016 | DeMarco | G01R 31/40 324/764.01 |
| 2016/0266213 A1* | 9/2016 | Kim | G01R 19/16542 |
| 2016/0329731 A1* | 11/2016 | Kokot, Jr. | H02J 7/0048 |
| 2016/0380567 A1* | 12/2016 | Grafling | H02J 7/007192 322/28 |
| 2017/0095667 A1* | 4/2017 | Yakovlev | A61N 1/0553 |
| 2017/0141589 A1* | 5/2017 | Inoue | H02J 7/00 |
| 2017/0214253 A1* | 7/2017 | Kim | H02J 7/0018 |
| 2017/0264104 A1* | 9/2017 | Horitake | B60R 16/033 |
| 2018/0041054 A1* | 2/2018 | Nakamoto | H02J 7/00308 |
| 2018/0131213 A1* | 5/2018 | Nepote | H02J 7/16 |
| 2018/0134168 A1* | 5/2018 | Keller | H02J 7/007182 |
| 2018/0226810 A1* | 8/2018 | Barsukov | H02J 7/0048 |
| 2018/0290557 A1* | 10/2018 | Koishi | F02N 11/087 |
| 2018/0313899 A1* | 11/2018 | Yasunori | H02J 7/0048 |
| 2019/0044344 A1* | 2/2019 | Horitake | B60L 58/15 |
| 2019/0190507 A1* | 6/2019 | Remple | G06F 1/32 |
| 2019/0280488 A1* | 9/2019 | Tang | H01M 10/425 |
| 2022/0001768 A1* | 1/2022 | Koishi | B60L 58/12 |

* cited by examiner

VOLTAGE ESTIMATION FOR AUTOMOTIVE BATTERY CHARGING SYSTEM CONTROL

FIELD

The present application generally relates to automotive battery charging and, more particularly, to voltage estimation techniques for automotive battery charging system control.

BACKGROUND

Conventional automotive battery charging systems utilize a voltage at a positive battery feed (B+) terminal of the vehicle alternator for controlling recharging of a battery (e.g., a 12 volt lead-acid battery). For optimal packaging and weight distribution, the alternator and the battery are typically located in different areas of the vehicle with a long physical electrical cable therebetween. A fixed voltage offset compensation is therefore typically applied to compensate for differences between the alternator B+ terminal voltage and the battery terminal (e.g., due to voltage drop or loss along the long electrical connection). These conventional systems, however, are unable to adapt to dynamic changes in electrical resistance caused by current, temperature, and other time-varying factors. This could result in overcharging or undercharging of the battery, which could potentially reduce battery life. Accordingly, while such conventional automotive battery charging systems work for their intended purpose, there remains a need for improvement in the relevant art.

SUMMARY

According to one example aspect of the invention, a battery charging system configured to control charging of a battery of a vehicle is presented. In one exemplary implementation, the battery charging system comprises: a positive (B+) terminal voltage sensor configured to generate a B+ voltage signal indicative of a voltage at a B+ terminal of an alternator of the vehicle, an intelligent battery sensor (IBS) configured to generate an IBS voltage signal indicative of a voltage at a positive terminal of the battery, and a controller configured to: apply a high pass filter to the B+ voltage signal to obtain a filtered B+ voltage signal, apply a low pass filter to the IBS voltage signal to obtain a filtered IBS voltage signal, estimate a voltage of the battery using both the filtered B+ voltage signal and the filtered IBS voltage signal, adjust a target voltage for the battery based on the estimated battery voltage, and control charging of the battery using the adjusted target voltage to mitigate overcharging and undercharging of the battery.

In some implementations, the controller is configured to estimate the battery voltage by summing the filtered B+ voltage signal and the filtered IBS voltage signal. In some implementations, the controller is configured to control recharging of the battery using a proportional-integral (PI) control scheme with a difference between the target and estimated battery voltages as an input and a pulse-width modulated (PWM) duty cycle for the alternator as an output. In some implementations, the high and low pass filters each have a calibratable pass frequency band.

In some implementations, the IBS sensor is configured to: measure the voltage, a temperature, and a state of charge (SOC) at the positive terminal of the battery at a low sampling rate, and communicate the IBS voltage signal to the controller via one or more communication buses, wherein at least one of the low sampling rate and the communication via the one or more communication buses causes a delay in the controller receiving the IBS voltage signal. In some implementations, the B+ voltage sensor is a circuit having dedicated wiring connecting the alternator B+ terminal to the controller and communicating the B+ voltage signal directly to the controller via an analog-to-digital (A/D) converter such that the B+ voltage signal does not have the delay that the IBS voltage signal has.

In some implementations, the mitigation of overcharging and undercharging of the battery at least one of extends a life of the battery and prevents damage to the battery. In some implementations, the controller determines the adjusted target voltage for the battery without applying an offset compensation value to the B+ voltage signal.

According to another example aspect of the invention, a method for controlling charging of a battery of a vehicle is presented. In one exemplary implementation, the method comprises: receiving, by a controller of the vehicle and from a positive (B+) voltage sensor, a B+ voltage signal indicative of a voltage at a B+ terminal of an alternator of the vehicle, receiving, by the controller and from an IBS, an IBS voltage signal indicative of a voltage at a positive terminal of the battery, applying, by the controller, a high pass filter to the B+ voltage signal to obtain a filtered B+ voltage signal, applying, by the controller, a low pass filter to the IBS voltage signal to obtain a filtered IBS voltage signal, estimating, by the controller, a voltage of the battery using both the filtered B+ voltage signal and the filtered IBS voltage signal, adjusting, by the controller, a target voltage for the battery based on the estimated battery voltage, and controlling, by the controller, charging of the battery using the adjusted target voltage to mitigate overcharging and undercharging of the battery.

In some implementations, estimating the battery voltage comprises summing the filtered B+ voltage signal and the filtered IBS voltage signal. In some implementations, the controller is configured to control recharging of the battery using a PI control scheme with a difference between the target and estimated battery voltages as an input and a PWM duty cycle for the alternator as an output. In some implementations, the high and low pass filters each have a calibratable pass frequency band.

In some implementations, the IBS sensor is configured to: measure the voltage, a temperature, and a SOC at the positive terminal of the battery at a low sampling rate, and communicate the IBS voltage signal to the controller via one or more communication buses, wherein at least one of the low sampling rate and the communication via the one or more communication buses causes a delay in the controller receiving the IBS voltage signal. In some implementations, the B+ voltage sensor is a circuit having dedicated wiring connecting the alternator B+ terminal to the controller and communicating the B+ voltage signal directly to the controller via an A/D converter such that the B+ voltage signal does not have the delay that the IBS voltage signal has.

In some implementations, the mitigation of overcharging and undercharging of the battery at least one of extends a life of the battery and prevents damage to the battery. In some implementations, the determining of the adjusted target voltage for the battery is performed without applying an offset compensation value to the B+ voltage signal.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, conventional battery charging techniques typically apply a fixed voltage offset to compensate for differences between the alternator positive (B+) terminal voltage and the battery terminal voltage. These techniques, however, are unable to compensate for transient operating conditions, such as changes in current (e.g., electrical load changes) or temperature, or changes in resistance over time due to age or corrosion. As a result, the determined battery voltage could be inaccurate, which could result in overcharging and/or undercharging. Repeated overcharging and/or undercharging of the battery could result in decreased battery life and/or damage to the battery. Accordingly, improved battery voltage estimation and charging control techniques are presented. These techniques leverage both the alternator B+ voltage signal in addition to a low cost intelligent battery sensor (IBS) voltage signal and apply high and low pass filters thereto, respectively, and utilize the filtered signals/values collectively to obtain a more accurate estimation of the battery voltage, particularly during transient operating conditions. This estimated voltage is then utilized in a feedback-based control scheme to adjust the target voltage for the battery, which is used to generate a duty cycle of the alternator to operate at. Potential benefits include extended battery life, reduced warranty costs, and the ability to arrange the alternator and the battery in any desired locations of the vehicle (e.g., far apart) for optimal packaging and weight distribution.

Figure 1:
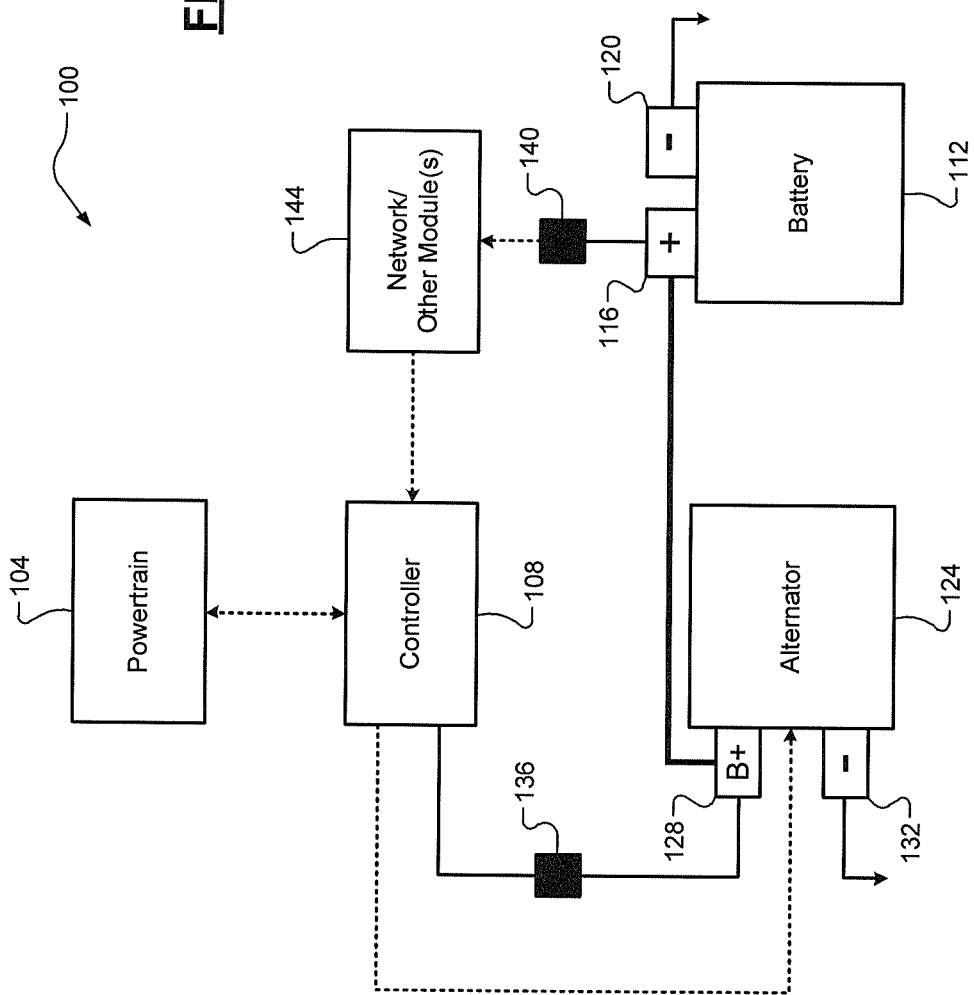
FIG. 1 is a functional block diagram of a vehicle having an example battery charging system according to the principles of the present disclosure.

Referring now to FIG. 1, a functional block diagram of a vehicle 100 having a battery charging system according to the principles of the present disclosure is illustrated. The vehicle 100 comprises a powertrain 104 (an internal combustion engine, an electric motor, combinations thereof, etc.) configured to generate drive torque for vehicle propulsion. The powertrain 104 is controlled by a controller 108 (e.g., a powertrain control module) to generate a desired amount of drive torque. The vehicle 100 also comprises a battery 112 (e.g., a 12 volt lead-acid battery) that is configured to power various electrical loads, such as accessory components and engine cranking. The battery 112 has a positive terminal 116 and a negative or ground terminal 120. The battery 112 is charged by an alternator 124, which could be mechanically driven by the powertrain 104 to generate an electrical current. The alternator 124 has a positive (B+) terminal 128 and a negative or ground terminal 132. The B+ terminal 128 of the alternator 124 is connected to the positive terminal 116 of the battery 112 as shown. The battery charging system of the present disclosure generally comprises the controller 108, a B+ voltage sensor 136, and an IBS 140.

In one exemplary implementation, the B+ voltage sensor 136 is not actually a sensor but rather is a circuit having dedicated wiring connecting the B+ terminal 128 of the alternator 124 to the controller 108 and communicating a B+ voltage signal directly to the controller 108 via an analog-to-digital (A/D) converter (not shown). It will be appreciated, however, that the B+ voltage sensor 136 could have an alternate configuration. The B+ voltage signal provided to the controller 108 is directly provided and thus has little or no delay associated therewith. The IBS 140 is directly connected to the positive terminal 116 of the battery 112 and is configured to accurately measure various parameters of the battery 112, including, but not limited to, voltage, temperature, and SOC. An IBS voltage signal indicative of the voltage of the battery 112 is transmitted to the controller 108 via various module(s) and/or network(s) (e.g., communication buses, such as a controller area network, or CAN) and thus has a delay associated therewith. The IBS 140, being a low cost device, also operates at a relatively low sampling rate (e.g., because it is designed for SOC monitoring), thereby causing further delay with the arrival of the IBS voltage signal at the controller 108.

Figure 2:
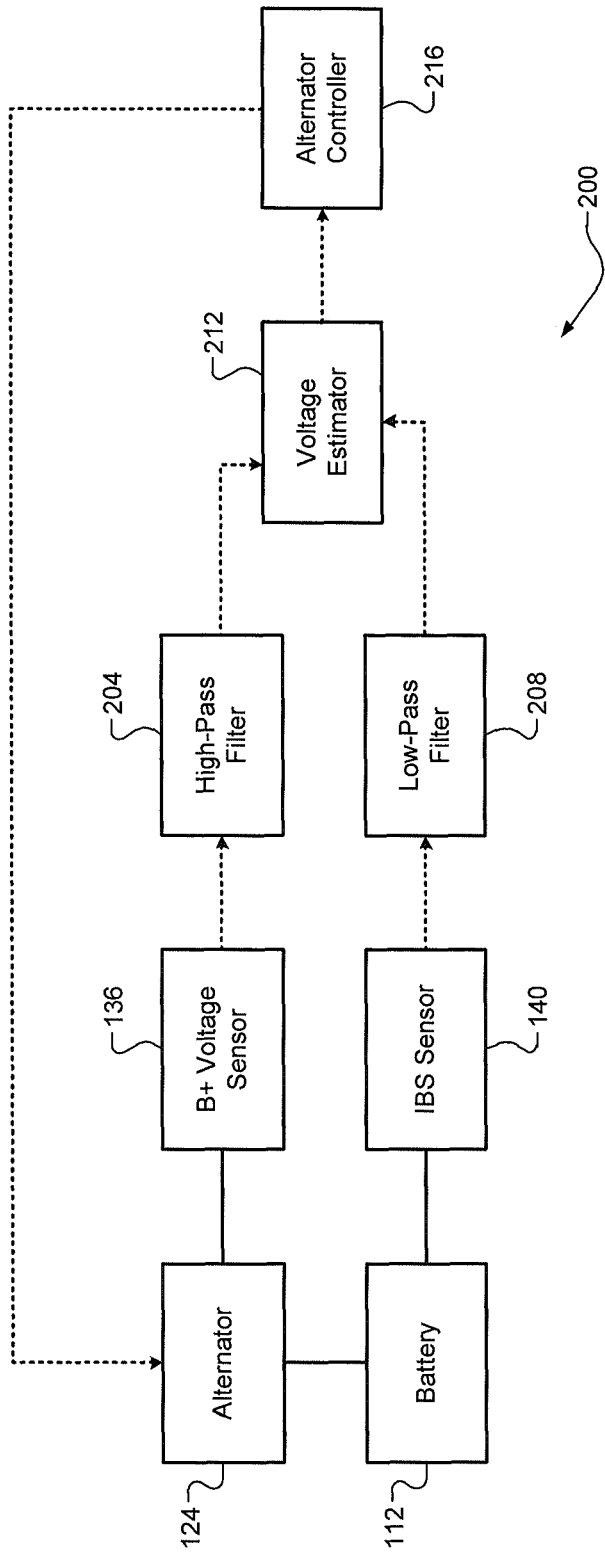
FIG. 2 is functional block diagram of a battery voltage estimation and charging control architecture according to the principles of the present disclosure.

Using the high frequency components of the B+ voltage signal and the low frequency components of the IBS voltage signal, the controller 108 is configured to estimate the voltage of the battery 112 and adjust a target voltage for charging of the battery 112 accordingly. Referring now to FIG. 2, a functional block diagram of an example battery voltage estimation and charging control architecture 200 according to the principles of the present disclosure is illustrated. This architecture 200 could be implemented, for example, by the controller 108. A high pass filter 204 is applied to the B+ voltage signal from the B+ voltage sensor 136 to eliminate low frequency steady-state voltage (including any alternator-battery voltage offset) and obtain a filtered B+ voltage signal indicative of high frequency voltage transients (e.g., in response to changing electrical loads). In parallel with the high pass filtering, a low pass filter 208 is applied to the IBS voltage signal from the IBS 140 to eliminate high frequency voltage transients and obtain a filtered IBS voltage signal indicative of the low frequency steady-state voltage of the battery 112. Filter parameters, such as the respective frequency pass bands or ranges of the respective filters 204, 208, are calibratable and could be tuned based on testing for each vehicle configuration.

A voltage estimator 212 estimates the voltage of the battery 112 using both the filtered B+ voltage signal and the filtered IBS voltage signal. In one exemplary implementation, this is a summation of the two filtered signal values, but it will be appreciated that the specific formula could be calibrated or tuned. Thus, the estimated voltage has the transient characteristics of the alternator B+ voltage measurement, but is centered about the steady-state IBS voltage measurement. This means that any offset between the alternator B+ voltage and the actual battery voltage is also eliminated while still preserving the B+ voltage signal's high frequency characteristics. Once the estimated voltage of the battery 112 is obtained, a difference between a target voltage (e.g., a previous target voltage) and the estimated voltage is calculated. This voltage difference or voltage error represents an adjustment to the target voltage. An alternator controller 216 uses this voltage error to generate a duty cycle (e.g., a pulse-width modulated, or PWM signal) for the alternator 124 to operate at. In one exemplary implementation, the alternator controller 216 uses a proportional-integral (PI) control scheme, but it will be appreciated that any feedback-based control scheme could be utilized.

Figure 3:
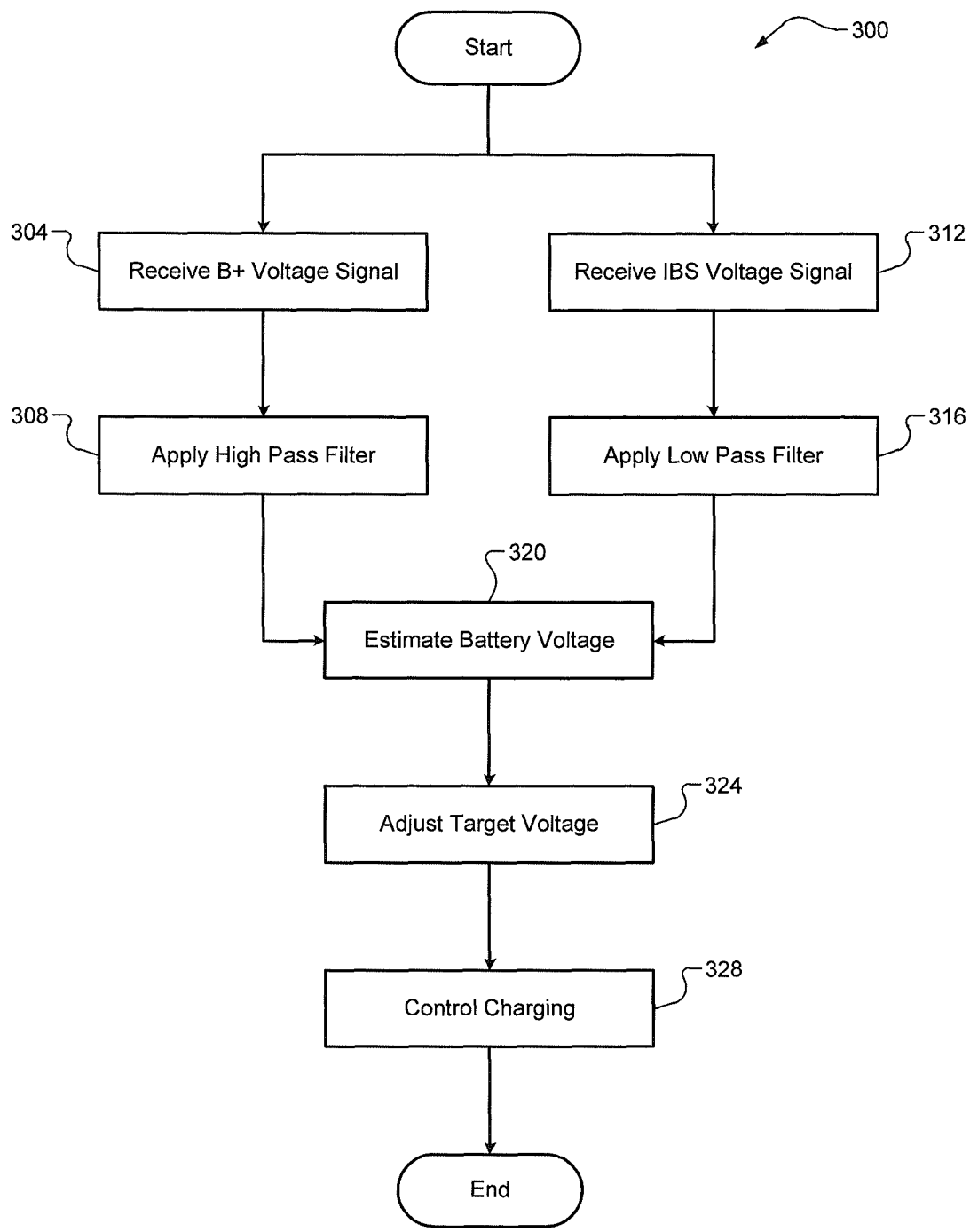
FIG. 3 is a flow diagram of an example voltage estimation method for automotive battery charging system control according to the principles of the present disclosure.

Referring now to FIG. 3, a flow diagram of an example method 300 for charging a vehicle battery according to the principles of the present disclosure is illustrated. At 304, the controller 108 receives the B+ voltage signal from the B+ voltage sensor 136. At 312, the controller 108 applies a high pass filter to the B+ voltage signal to obtain a filtered B+ voltage signal. In a parallel path at 312, the controller 108 receives the IBS voltage signal from the IBS sensor 140. At 316, the controller 108 applies a low pass filter to the IBS voltage signal to obtain a filtered IBS voltage signal. At 320, the controller 108 estimates the voltage of the battery 112 using both the filtered B+ voltage signal and the filtered IBS voltage signal. In one exemplary implementation, this involves a summation of the two filtered signals. At 324, the controller 108 adjusts a target voltage for the battery 112 based on the estimated battery voltage. This could be, for example, part of a PI or other feedback-based control scheme. In one exemplary implementation, the controller 108 attempts to charge the battery 112 according to a supplier-provided ideal battery temperature/voltage curve. Lastly, at 328, the controller 108 controls charging of the battery 112 using the adjusted target voltage to mitigate overcharging and undercharging of the battery 112. This could involve, for example, generating a duty cycle (e.g., a PWM duty cycle) for the alternator 124 to operate at. The method 300 then ends or returns to 304 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery charging system configured to control charging of a battery of a vehicle, the battery charging system comprising:
    a positive (B+) terminal voltage sensor configured to generate a B+voltage signal indicative of a voltage at a B+terminal of an alternator of the vehicle;
    an intelligent battery sensor (IBS) configured to generate an IBS voltage signal indicative of a voltage at a positive terminal of the battery; and
    a controller configured to:
        apply a high pass filter to the B+voltage signal to obtain a filtered B+voltage signal;
        apply a low pass filter to the IBS voltage signal to obtain a filtered IBS voltage signal;
        estimate a voltage of the battery using both the filtered B+voltage signal and the filtered IBS voltage signal;
        adjust a target voltage for the battery based on the estimated battery voltage; and
        control charging of the battery using the adjusted target voltage to mitigate overcharging and undercharging of the battery.

2. The battery charging system of claim 1, wherein the high and low pass filters each have a calibratable pass frequency band.

3. The battery charging system of claim 1, wherein the mitigation of overcharging and undercharging of the battery at least one of extends a life of the battery and prevents damage to the battery.

4. The battery charging system of claim 1, wherein the controller determines the adjusted target voltage for the battery without applying an offset compensation value to the B+voltage signal.

5. The battery charging system of claim 1, wherein the controller is configured to estimate the battery voltage by summing the filtered B+voltage signal and the filtered IBS voltage signal.

6. The battery charging system of claim 5, wherein the controller is configured to control recharging of the battery using a proportional-integral (PI) control scheme with a difference between the target and estimated battery voltages as an input and a pulse-width modulated (PWM) duty cycle for the alternator as an output.

7. The battery charging system of claim 1, wherein the IBS sensor is configured to:
    measure the voltage, a temperature, and a state of charge (SOC) at the positive terminal of the battery at a low sampling rate; and
    communicate the IBS voltage signal to the controller via one or more communication buses,
    wherein at least one of the low sampling rate and the communication via the one or more communication buses causes a delay in the controller receiving the IBS voltage signal.

8. The battery charging system of claim 7, wherein the B+voltage sensor is a circuit having dedicated wiring connecting the alternator B+terminal to the controller and communicating the B+voltage signal directly to the controller via an analog-to-digital (ND) converter such that the B+voltage signal does not have the delay that the IBS voltage signal has.

9. A method for controlling charging of a battery of a vehicle, the method comprising:
    receiving, by a controller of the vehicle and from a positive (B+) voltage sensor, a B+voltage signal indicative of a voltage at a B+terminal of an alternator of the vehicle;
    receiving, by the controller and from an intelligent battery sensor (IBS), an IBS voltage signal indicative of a voltage at a positive terminal of the battery;
    applying, by the controller, a high pass filter to the B+voltage signal to obtain a filtered B+voltage signal;
    applying, by the controller, a low pass filter to the IBS voltage signal to obtain a filtered IBS voltage signal;
    estimating, by the controller, a voltage of the battery using both the filtered B+voltage signal and the filtered IBS voltage signal;
    adjusting, by the controller, a target voltage for the battery based on the estimated battery voltage; and
    controlling, by the controller, charging of the battery using the adjusted target voltage to mitigate overcharging and undercharging of the battery.

10. The method of claim 9, wherein the high and low pass filters each have a calibratable pass frequency band.

11. The method of claim 9, wherein the mitigation of overcharging and undercharging of the battery at least one of extends a life of the battery and prevents damage to the battery.

12. The method of claim 9, wherein the determining of the adjusted target voltage for the battery is performed without applying an offset compensation value to the B+voltage signal.

13. The method of claim 9, wherein estimating the battery voltage comprises summing the filtered B+voltage signal and the filtered IBS voltage signal.

14. The method of claim 13, wherein the controller is configured to control recharging of the battery using a proportional-integral (PI) control scheme with a difference between the target and estimated battery voltages as an input and a pulse-width modulated (PWM) duty cycle for the alternator as an output.

15. The method of claim 9, wherein the IBS sensor is configured to:
    measure the voltage, a temperature, and a state of charge (SOC) at the positive terminal of the battery at a low sampling rate; and
    communicate the IBS voltage signal to the controller via one or more communication buses,
    wherein at least one of the low sampling rate and the communication via the one or more communication buses causes a delay in the controller receiving the IBS voltage signal.

16. The method of claim 15, wherein the B+voltage sensor is a circuit having dedicated wiring connecting the alternator B+terminal to the controller and communicating the B+voltage signal directly to the controller via an analog-to-digital (ND) converter such that the B+voltage signal does not have the delay that the IBS voltage signal has.

* * * * *